United States Patent
Schmidt

(10) Patent No.: US 8,154,175 B2
(45) Date of Patent: Apr. 10, 2012

(54) SENSING DEVICE

(75) Inventor: Samuel Schmidt, Windsor Locks, CT (US)

(73) Assignee: Hamilton Sundstrand Corporation, Windsor Locks, CT (US)

(*) Notice: Subject to any disclaimer, the term of this patent is extended or adjusted under 35 U.S.C. 154(b) by 84 days.

(21) Appl. No.: 12/639,104

(22) Filed: Dec. 16, 2009

(65) Prior Publication Data

US 2011/0139594 A1 Jun. 16, 2011

(51) Int. Cl.
*H01L 41/113* (2006.01)

(52) U.S. Cl. .......................... 310/338; 310/330

(58) Field of Classification Search ............ 310/324, 310/338, 339, 330
See application file for complete search history.

(56) References Cited

U.S. PATENT DOCUMENTS

| | | | |
|---|---|---|---|
| 5,165,289 A * | 11/1992 | Tilmans | 73/862.59 |
| 5,270,595 A | 12/1993 | Wisner | |
| 5,493,390 A | 2/1996 | Varasi et al. | |
| 5,545,007 A | 8/1996 | Martin | |
| 5,999,005 A | 12/1999 | Fujii et al. | |
| 6,104,119 A | 8/2000 | Guzik et al. | |
| 6,356,007 B1 | 3/2002 | Silva | |
| 6,360,615 B1 | 3/2002 | Smela | |
| 6,450,006 B1 | 9/2002 | Dougherty | |
| 7,093,498 B2 | 8/2006 | Herbert et al. | |
| 7,318,007 B2 | 1/2008 | Barkhoudarian | |
| 7,732,994 B2 * | 6/2010 | Clingman et al. | 310/339 |
| 2005/0093398 A1 * | 5/2005 | Kim et al. | 310/324 |
| 2005/0160827 A1 * | 7/2005 | Zdeblick et al. | 73/715 |
| 2006/0022555 A1 * | 2/2006 | Balasubramaniam et al. | 310/339 |
| 2007/0277616 A1 * | 12/2007 | Nikkel et al. | 73/715 |

* cited by examiner

*Primary Examiner* — Derek Rosenau
(74) *Attorney, Agent, or Firm* — Carlson, Gaskey & Olds, P.C.

(57) ABSTRACT

A sensing device is disclosed that includes a bistable snap mechanism having a snap element operatively connected to an input element and an output element. The snap element has two discrete positions that provide the output element in one of first and second positions. A resistive sensing element includes a flexible member operatively connected to the output element and is configured to deflect in response to movement of the output element between the first and second positions. A resistor is mounted on the flexible member and is configured to provide a variable resistance based upon deflection of the flexible member.

10 Claims, 2 Drawing Sheets

SENSING DEVICE

BACKGROUND

This disclosure relates to sensing device that uses a mechanical snap mechanism and a resistive sensing element.

A wide variety of sensing devices are used to perform, for example, position sensing. When simple, low cost position sensing is desired, a position indicating electrical switch is often used. Switches can exhibit poor reliability in typical aerospace applications, particularly due to sensitivity to contamination of electrical contacts and deterioration within the switch from vibration. Aerospace applications in particular demand reliable switch operation. Continuously monitoring health of the switch contacts is impractical since electrical switches typically have make/break contacts. Thus, switch failures often occur without any prior warning.

SUMMARY

A sensing device is disclosed that includes a bistable snap mechanism having a snap element operatively connected to an input element and an output element. The snap element has two discrete positions that provide the output element in one of first and second positions. A resistive sensing element includes a flexible member operatively connected to the output element and is configured to deflect in response to movement of the output element between the first and second positions. A resistor is mounted on the flexible member and is configured to provide a variable resistance based upon deflection of the flexible member.

In one example, the resistive sensing element includes a generally circular base providing an opening. The flexible member extends from the base into the opening and is configured to deflect relative to the base. A piezoresistor is mounted on the flexible member and is configured to provide a variable resistance based upon deflection of the flexible member.

An example method of sensing an input includes receiving an input. The output element moves in response to the input. The flexible member deflects in response to the output element moving, and the resistance of a resistor varies. A signal is provided based upon the resistance that corresponds to an input state.

BRIEF DESCRIPTION OF THE DRAWINGS

The disclosure can be further understood by reference to the following detailed description when considered in connection with the accompanying drawings wherein.

DETAILED DESCRIPTION

Figure 1:
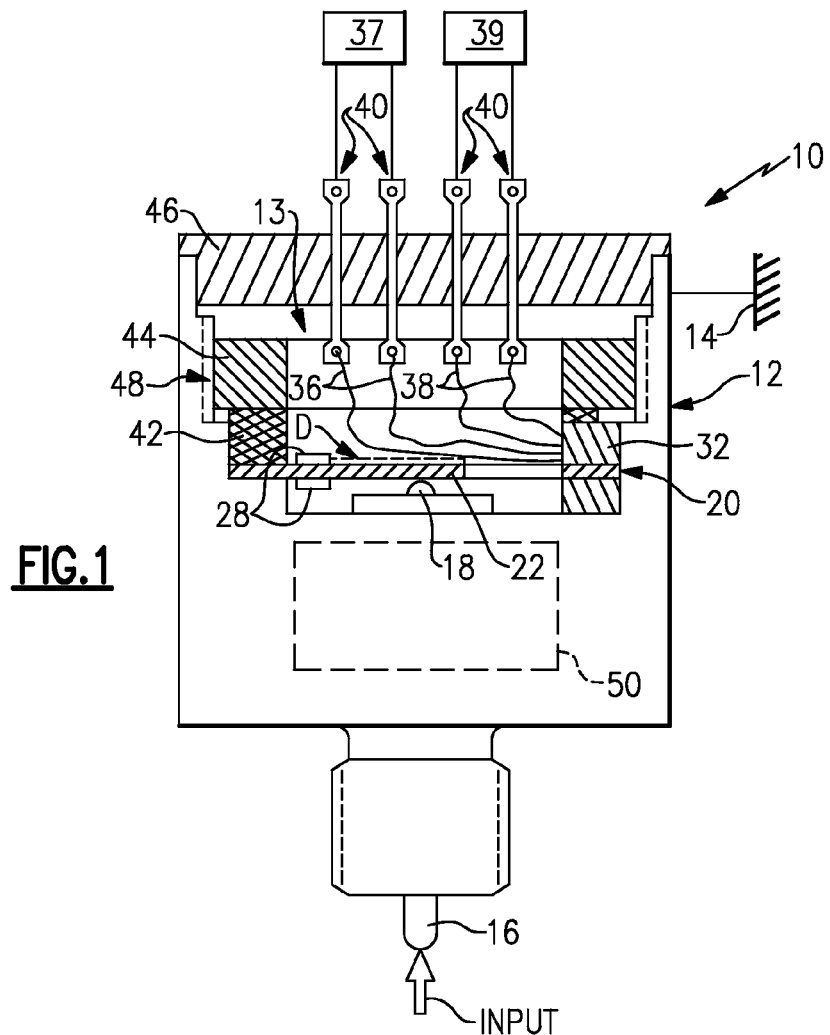
FIG. 1 is a cross-sectional view of an example sensing device.

A sensing device 10 is illustrated in FIG. 1 and includes a housing 12 fixedly mounted to a structure 14 in one example. The sensing device 10 includes an input element 16 that receives an input for which it is desirable to determine an input state, which may be force, pressure or temperature. The input element 16 cooperates with an output element 18, which is movable relative to the housing 12 in the example.

Figure 2:
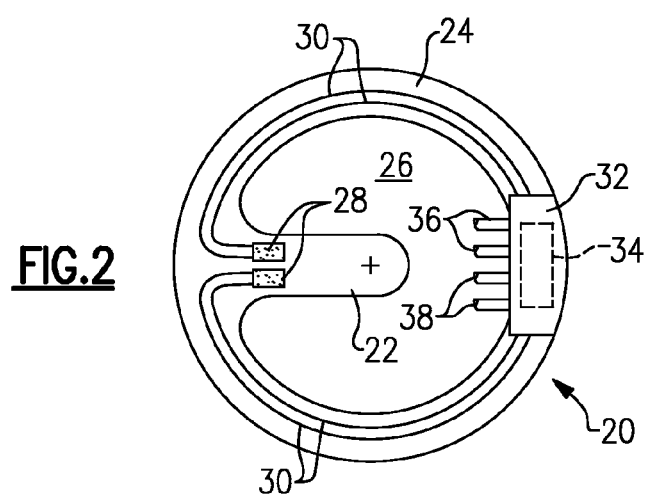
FIG. 2 is an elevational view of a sensing element.
Figure 3:
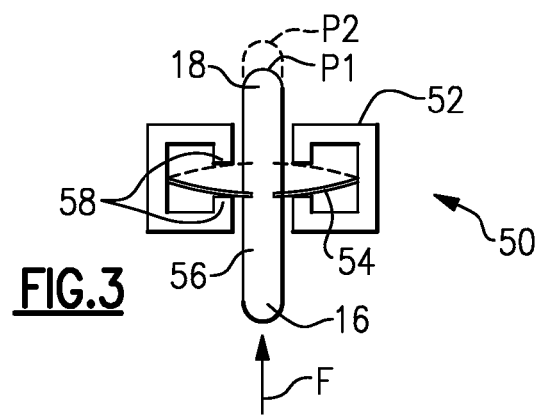
FIG. 3 is a schematic view of an example snap mechanism.
Figure 4:
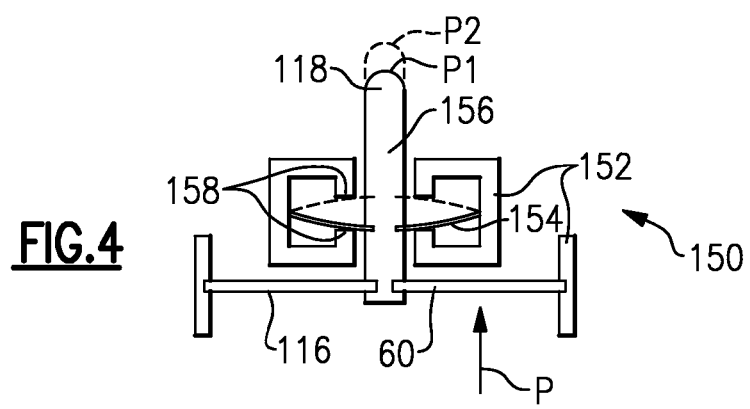
FIG. 4 is a schematic view of another example snap mechanism.
Figure 5:
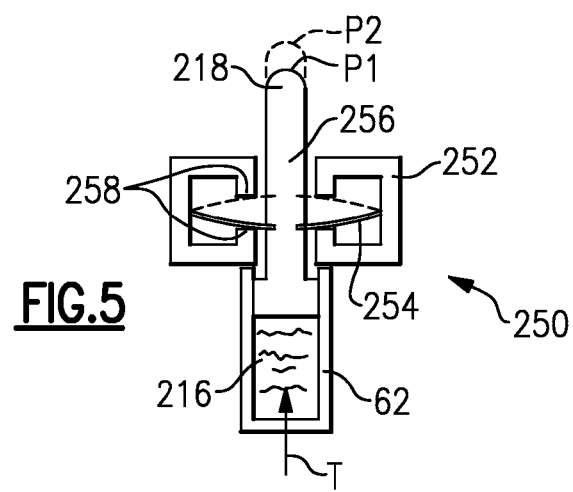
FIG. 5 is a schematic view of yet another example snap mechanism.

The output element 18 is operatively connected to a resistive sensing element 20, which includes a flexible member 22 that cooperates with the output element 18. The output element 18 engages the flexible member 22 in one example. The input state is transmitted to the resistive sensing element 20 by the output element 18 via the input element 16. Referring to FIG. 2, the resistive sensing element 20 is arranged within a cavity 13 in the housing 12 and includes a generally circular base 24, for example, that provides an opening 26. The base 24 is securely retained relative to the housing 12, and the flexible member 22 deflects relative to the base 24 in response to axially movement of the output element 18, for example, between first and second positions P1, P2 (FIGS. 3-5).

In the example, a spacer 42 is arranged between the resistive sensing element 20 and a retainer 44, which is secured to the housing 12 at a threaded interface 48. A cap 46 seals the cavity 13 to prevent debris from penetrating the sensing device 10.

The resistive sensing element 20 includes one or more strain gauge resistors 28 mounted on the flexible member 22 such that the resistance of the resistor 28 varies as the flexible member 22 is deflected. The flexible member 22 can be protected from overstress with a mechanical stop to limit its deflection. The resistor 28 is provided in a wheatstone bridge 34. An example wheatstone bridge includes four resistors, and a measured voltage is indicative of a resistance of the resistor 28. The resistance varies with the deflection of the flexible member 22. The measured voltage is indicative of the deflected position D of the flexible member 22. Any number of the four resistors 28 may be active, or variable, and the remaining resistors 28 may be fixed, or constant. In one example, a pair of piezoresistors 28 is provided on each of the opposing sides of the flexible member 22. Providing one pair of piezoresistors 28 in tension and another pair of piezoresistors in compression provides better sensitivity, if desired.

A housing 32 is provided on the resistive sensing element 20. Element leads 30 are provided from the resistors 28 to connections within the housing 32, for example, that are configured to provide the wheatstone bridge 34. In one example, the element leads 30 are supported on the base 24. Power input leads 36 and voltage output leads 38 connected to the wheatstone bridge 34 extend from the housing 32 to terminals 40. A power source 37 provides power to the wheatstone bridge 34 through the power input leads 36. A controller 39 measures the voltage signal across the wheatstone bridge 34 at the voltage output leads 38, which corresponds to the resistance indicative of the deflected position D which in turn corresponds to the input state. In this manner, a continuous resistance signal is available. The resistance signal can be monitored at any time by measuring the voltage to determine the health of the sensing device 10.

A snap mechanism 50 (schematically shown in FIG. 2) may be provided between the input element 16 and the output element 18 to provide a bistable switch having two discrete positions. A first position P1 is indicative of the input state being below a given threshold, or "off," and the second position P2 is indicative of the input state being at or above the threshold, or "on." The snap mechanism 50 maintains a positive reacting force throughout the operating stroke of the output element 18. A disc in the snap mechanism 50 deflects as the input increases until a maximum threshold force is applied to the disc at which point the disc "snaps" over.

FIG. 3 illustrates an example force measurement configuration. A stem 56 provides the input element 16 (receiving a force F) and the output element 18. A structure 52 supports a snap element 54 connected to the stem 56. The snap element 54, which is a flexible disc in one example, has a concave configuration with the stem 56 in the first position P1. Upon the force F reaching a threshold force, the snap element 54 is deflected to a convex configuration (dashed line) that moves the stem 56 to the second position P2. Stops 58 limit the travel of the stem 56.

FIG. 4 illustrates an example pressure measurement configuration. A stem 156 is connected to a diaphragm 60 that provides the input element 116 (receiving a pressure P). The stem 156 provides the output element 118. A structure 152 supports the diaphragm 60 and a snap element 154 that is connected to the stem 156. The snap element 154 of the snap mechanism 150 has a concave configuration with the stem 156 in the first position P1. Upon the pressure P reaching a threshold pressure, the snap element 154 is deflected to a convex configuration (dashed line) that moves the stem 156 to the second position P2. Stops 158 limit the travel of the stem 156.

FIG. 5 illustrates an example temperature measurement configuration provided by the snap mechanism 250. A reservoir 62 filled with a material 216 having thermally variable volume provides the input element 116 with the volume change in response to a temperature T. The stem 256 cooperates with the material in the reservoir 62 and provides the output element 218. A structure 252 supports a snap element 254 connected to the stem 256. The snap element 254 has a concave configuration with the stem 256 in the first position P1. Upon the volume of the material expanding a sufficient amount indicative of a threshold temperature, the snap element 254 is deflected to a convex configuration (dashed line) that moves the stem 256 to the second position P2. Stops 258 limit the travel of the stem 256.

Although an example embodiment has been disclosed, a worker of ordinary skill in this art would recognize that certain modifications would come within the scope of the claims. For that reason, the following claims should be studied to determine their true scope and content.

What is claimed is:

1. A sensing device comprising:
a bistable snap mechanism including a snap element operatively connected to an input element and an output element, the snap element having two discrete positions that provides the output element in one of first and second positions;
a resistive sensing element including a flexible member operatively connected to the output element and configured to deflect in response to movement of the output element between the first and second positions, a resistor mounted on the flexible member and configured to provide a variable resistance based upon deflection of the flexible member.

2. The sensing device according to claim 1, wherein the snap element includes a flexible disc configured to move between concave and convex configurations.

3. The sensing device according to claim 2, wherein the bistable snap mechanism includes a stem connected to the flexible disc, the stem providing the output element.

4. The sensing device according to claim 3, wherein the stem is configured to move along an axis between the first and second positions in response to the flexible disc moving between the concave and convex configurations.

5. The sensing device according to claim 3, wherein the first and second positions respectively correspond to the flexible disc in the concave and convex positions, the bistable snap mechanism having a biasing member operatively connected to the flexible disc and configured to return the output element to the first position.

6. The sensing device according to claim 1, wherein the input element includes a diaphragm.

7. The sensing device according to claim 1, wherein the input element includes a material with thermally variable volume.

8. The sensing device according to claim 1, comprising a housing supporting the bistable snap mechanism and the resistive sensing element.

9. The sensing device according to claim 8, wherein the resistive sensing element includes a base secured to the housing and the flexible member extending from the base and engaging the output element.

10. The sensing device according to claim 1, wherein the resistive sensing element includes a wheatstone bridge that includes the resistor.

* * * * *